(12) United States Patent
Swindell et al.

(10) Patent No.: US 11,442,748 B2
(45) Date of Patent: Sep. 13, 2022

(54) APPLICATION DISPLAY AND DISCOVERY BY PREDICTING BEHAVIOR THROUGH MACHINE-LEARNING

(71) Applicant: Citrix Systems, Inc., Fort Lauderdale, FL (US)

(72) Inventors: Edward J. Swindell, Cambridge (GB); Duncan Gabriel, Cambridge (GB); Henry J. Ashman, Cambridge (GB)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 750 days.

(21) Appl. No.: 15/497,938

(22) Filed: Apr. 26, 2017

(65) Prior Publication Data
US 2018/0314972 A1    Nov. 1, 2018

(51) Int. Cl.
G06F 9/451 (2018.01)
G06N 20/00 (2019.01)

(52) U.S. Cl.
CPC ............ G06F 9/451 (2018.02); G06N 20/00 (2019.01)

(58) Field of Classification Search
CPC ................................ G06N 20/00; G06F 9/451
See application file for complete search history.

(56) References Cited

U.S. PATENT DOCUMENTS

| | | | | |
|---|---|---|---|---|
| 9,760,399 | B1 * | 9/2017 | Fraser | G06F 9/485 |
| 10,089,661 | B1 * | 10/2018 | Appalaraju | G06F 16/907 |
| 10,282,451 | B1 * | 5/2019 | Ho | G06F 16/909 |
| 2012/0254198 | A1 * | 10/2012 | Shih | G06F 16/334 707/751 |
| 2015/0213376 | A1 * | 7/2015 | Ideses | G06N 20/00 706/12 |
| 2016/0381172 | A1 * | 12/2016 | Lopiano | H04W 4/21 709/204 |
| 2017/0213272 | A1 * | 7/2017 | Mowatt | G06Q 30/0204 |
| 2017/0323340 | A1 * | 11/2017 | Jeon | G06Q 30/0261 |
| 2018/0063276 | A1 * | 3/2018 | Foged | H04W 4/80 |
| 2018/0262991 | A1 * | 9/2018 | Rao | G06F 1/263 |

\* cited by examiner

Primary Examiner — Li B. Zhen
Assistant Examiner — Henry Nguyen
(74) Attorney, Agent, or Firm — Fox Rothschild LLP; Robert J. Sacco; Carol Thorstad-Forsyth (57) ABSTRACT

Systems and methods for ordering software applications in a computing environment. The methods involve: presenting user-selectable icons for launching a plurality of software applications in a graphical user interface in accordance with a first order; performing a machine-learning algorithm to determine a weighting value for each software application of the plurality of software applications based on information specifying at least one aspect of a software launch request and at least one aspect of a first user's current circumstance; determining a second order in which the user-selectable icons should be presented in the graphical user interface based on the weighting values determined for the software applications; and dynamically modifying the graphical user interface to present the user-selectable icons in the second order which is different from the first order.

23 Claims, 4 Drawing Sheets

APPLICATION DISPLAY AND DISCOVERY BY PREDICTING BEHAVIOR THROUGH MACHINE-LEARNING

BACKGROUND

Statement of the Technical Field

The present disclosure relates generally to computing systems. More particularly, the present disclosure relates to implementing systems and methods for application display and discovery by predicting behavior through machine-learning.

Description of the Related Art

There are many conventional computing systems that present software applications to users for use thereof. A user may have many software applications that (s)he uses on either a day-to-day or an infrequent basis, and even more that (s)he have available to him(her). A list of the software applications is generated and displayed by the computing systems to the user via a graphical user interface. The key handful of these software applications are typically brought to the top of a list based on the user's favorites and most used.

SUMMARY

The present disclosure concerns implementing systems and methods for ordering software applications in a computing environment. The methods comprise: presenting user-selectable icons for launching a plurality of software applications in a graphical user interface of a first computing device in accordance with a first order; performing, by the first computing device or a second remote computing device, a machine-learning algorithm to determine a weighting value for each software application of the plurality of software applications; determining, by the first computing device or the second remote computing device, a second order in which the user-selectable icons should be presented in the graphical user interface based on the weighting values determined for the software applications; and dynamically modifying the graphical user interface to present the user-selectable icons in the second order which is different from the first order. The weighting value provides a measure of likelihood that the first user wants to use a software application given the first user's current circumstance or a measure of probability that the first user will want to use the software application during a given time period or while at a given location.

In some scenarios, the weighting value is determined based on information specifying at least one aspect of a software launch request, information specifying at least one aspect of the first user's current circumstance, current circumstances of second users, software launch patterns of the second users with current circumstances that match the first user's current circumstance by a certain degree (e.g., ≥50% match), similarities of existing software applications, and/or popularity of existing software applications at a present time and/or at a given location. The first user's circumstance is defined by at least one of the first user's initial location, the first user's position held at an organization, and the first user's device capabilities.

In those or other scenarios, the first order is determined based on pre-learnt estimates for which software applications a user of the computing device would most likely want to use. The pre-learnt estimates are made based on behavior histories of second users with current circumstances that match the first user's current circumstance by a certain degree (e.g., ≥50% match). Additionally or alternatively, the first order is determined by: identifying at least one first user group of a plurality of user groups to which the first user should be assigned based on behavior histories of second users with current circumstances that match the first user's current circumstance by a certain degree (e.g., ≥50% match); selecting a first list of software applications generated for the first user group; and/or generating a combined list of software applications based on the first list of software applications associated with the first user group and a second list of software applications associated with a second user group. The first list of software applications is dynamically modified over time based on behavior histories of newly assigned users of the first user group.

BRIEF DESCRIPTION OF THE DRAWINGS

Embodiments will be described with reference to the following drawing figures, in which like numerals represent like items throughout the figures.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The present solution concerns application display prioritization and discovery based on machine-learning of previous behavior and other available information such as, but not limited to, user Active Directory ("AD") details, geo location, application details, and/or social media activity details. The present solution has many novel features that distinguish it from conventional solutions. In this regard, it should be noted that current application launchers rely on lists of favorites, user defined groups (e.g., a Citrix® Receiver and/or an Android® device), or a last used/most used approach (e.g., a Windows® start menu). In contrast, the present solution uses the location and time (amongst other things) of previous launches to predict which software applications the user would most likely want to use given his(her) current circumstances (e.g., as defined by a current location, time of day, position in an organization, etc.).

Additionally, it should be noted that conventional application discovery is often done based on popularity or based on the fact that people who liked X also like Y (e.g., determined via peoples' activity in relation to a Google® Play store and/or an Apple® App store). Allowing discovery of new applications based on behavior histories of people with similar patterns of launch and/or circumstances (e.g., locations, positions in an organizational structure), similar existing applications, and/or software application popularity at a given time and/or at a given location would show more relevant results. Accordingly, the present solution takes such criteria into account when predicating which software applications the user would most likely want to use at a given time and/or at a given location.

Conventional systems do use machine-learning algorithms employing behavior history information. However, the behavior history that is employed by the conventional machine-learning algorithms concerns activities performed by a single user. In contrast, the behavior histories employed by the present solution concerns activities performed by a plurality of users having circumstances that match the circumstances of a given user by a certain degree (e.g., ≥50%). In effect, the present solution provide a more robust solution with better results as compared to these conventional systems.

Additionally, the conventional systems often require some initial training (by asking the user for some things they already like/use) prior to generating a list of software applications. Poor results are provided by the conventional systems until sufficient data is available. This drawback of the conventional systems is overcome by the present solution via use of pre-learnt estimates of which software applications a new user is likely to want to use. The pre-learnt estimates are determined based on behavior histories of other users with circumstances that are the same as or similar to the circumstances of the user (e.g., as determined by organization data from an AD and/or initial locations). The behavior histories can specify similarities of launch patterns between the users over a pre-defined period of time (e.g., N weeks, months, years, etc.). If two users have different current positions in an organization, then the relationship between the positions may be considered here (e.g., the relationship of a paralegal with a particular attorney). In effect, the initial list of software applications presented to the user of the present solution matches (to a certain degree (e.g., ≥50%)) those of other users with similar circumstances, whereby the initial set-up operations of the application launcher are speed up and improved as compared to that of conventional application launchers.

As noted above, a user of a conventional computing device may have many software applications that (s)he uses on either a day-to-day or an infrequent basis, and even more that (s)he have available to him(her). A list of the software applications is generated and used by the computing device to display the same to the user. The key handful of these software applications are brought to the top of a list based on the user's favorites and most used.

While the key handful of software applications are brought to the top of the list in the above described manner, there are many other uses of software applications that can be predicted as the user's use thereof varies across time of day, day of the week, day of the month, coarse grained location and fine grained location. Being able to automatically bring to the top of the list the software applications that the user is most likely to want to use given his(her) current circumstances provides a much more pleasing user experience than having to go hunt through a long list for those software applications that are not in the top five (5) or even ten (10) day-to-day software applications (but that are still used regularly).

The user experience can be improved further by using not just the user's own history but also the behavior of other similar people within an organization. For example, a user who is at home may want to launch an email application, a web browser application for accessing a news website, and/or a weather and traffic application. Later that same day when (s)he is in the office, (s)he launches business related applications. The business related applications are used until a regular 2 PM meeting (where the user's computing device is connected to a different Wi-Fi access point). Notably, in some scenarios, the system determines that the user was in a meeting by directly accessing the user's electronic calendar, if the calendar has been made available to the system. During this meeting, the user uses PowerPoint and excel to give a presentation. The user's activities and corresponding software needs can be learned and predicted via the user's location, the user's previous behavior, and the time of day. The machine-learning and prediction can be reinforced by using the learned behavior of people who are deemed similar based on the software applications they use, the organizational structure (for instance sharing a manager or job title) to which they are associated, their locations and/or their social media activities. By implementing such learnt behaviors, the computing device of the present solution is able to predict which software applications the user is likely to need when (s)he visits a new location and/or has a change of job role.

With a large catalog of software applications that may be available to a particular user, finding new software applications that would be the most useful to him(her) can be difficult. People often start using new software applications after a recommendation from a colleague following a conversation about how a problem can be solved or how difficult something is to do. This is not ideal. Accordingly, the present solution provides a means for identifying the new software applications sooner than when a recommendation is made by another person.

As noted above, the present solution provides a means to show suggested software applications based on similar users (organizationally, geographically, and/or behaviorally). In effect, locally "trending" software applications are highlighted. In some scenarios, the following software applications may also be highlighted: new tools or new versions of already existing tools (e.g., Office 2016) that some of the other members of a user group (e.g., a sales team) have recently started using; and/or new presentation or video calling applications that some people have been using in the meeting rooms or in similar meetings.

Notably, software application predictions may take time to become effective for new users. In order to decrease the time it takes for the software application predictions to become effective, the present solution uses initial new user geographic locations and organizational data to seed the initial software application predictions.

The present solution will now be described in relation to application launcher scenarios. The present solution is not limited in this regard. The present solution can be used in any scenario in which software applications need to be listed and presented in an order determined based on a machine-learning technique. For example, the present solution can be used to assist administrators in the way they publish and host groups of software applications. In this way, the present solution can provide suggestions for software applications that can be added in an application group as they are used by the same users, suggestions for hosting software applications in a particular zone as they are used most heavily by people in that geographic location, and/or suggestions for additional software applications that may be useful to users that currently do not have access to certain software applications (e.g., subject to licenses).

Additionally or alternatively, the machine-learning functions of the present solution may employ a simple DataMart aggregation of software launch data by some criteria (e.g., time periods, location, etc.) for application discovery purposes. This may be combined with a user clustering based machine-learning algorithm to perform some cohort analysis which can be run periodically offline to provide the input for how the data should be aggregated.

Figure 1:
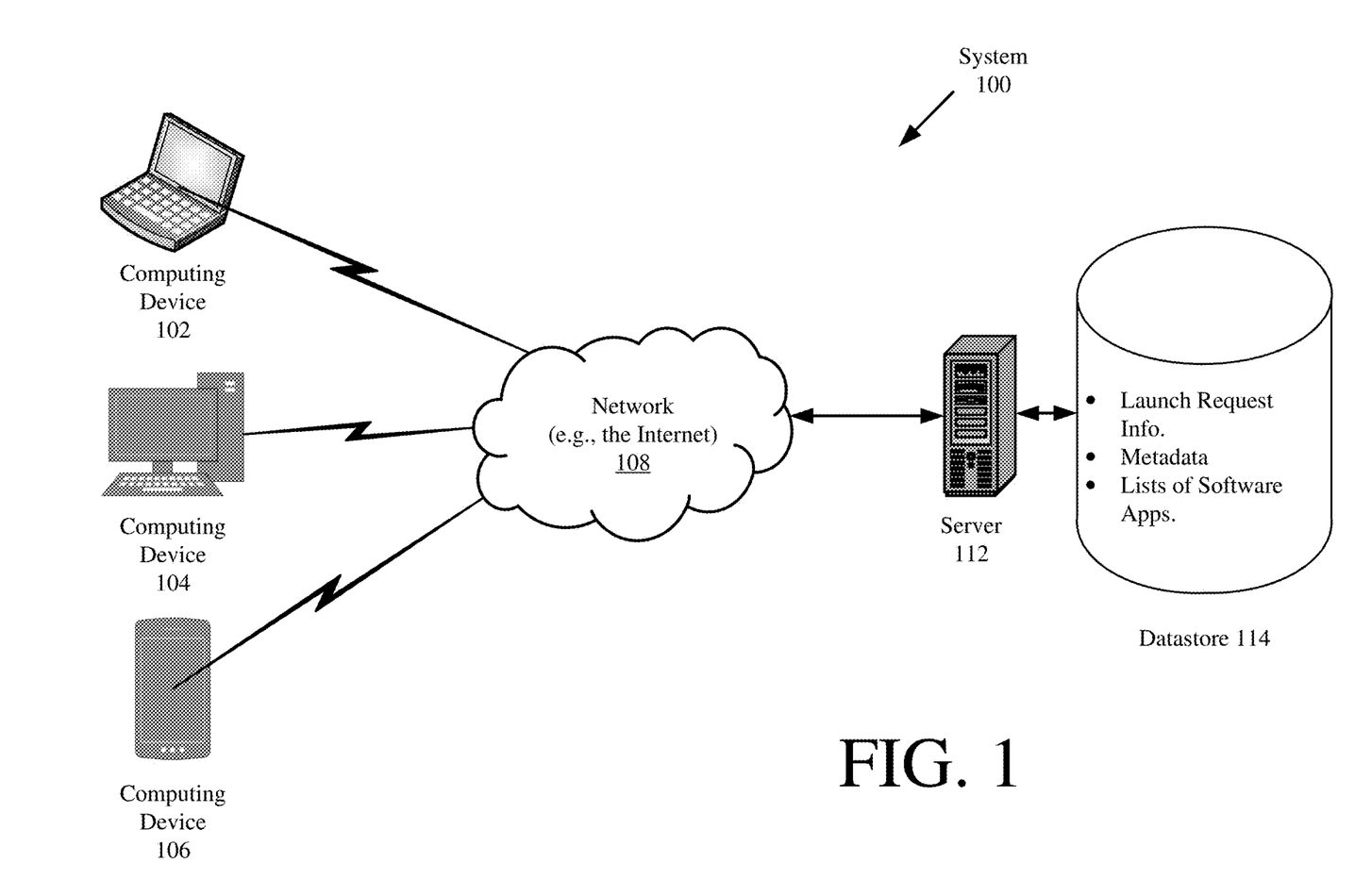
FIG. 1 is an illustration of an exemplary system.

Referring now to FIG. 1, there is provided an illustration of an exemplary system 100. System 100 is generally configured to use a machine-learning algorithm to predict behavior that is useful for application display and discovery of software applications. Machine-learning is a type of Artificial Intelligence ("AI") that provides computers with the ability to learn without being explicitly programmed through the automation of analytical model building based on data analysis. In some scenarios, the machine-learning algorithm is configured to: recognize patterns of user behavior, relationships and trends from data; establish baseline behavioral profiles for users and/or user groups based on the recognized patterns; and make predictions about which software applications would be of interest to users based on established baseline behavioral profiles. The baseline behavioral profiles may change over time as new users join the system. The machine-learning algorithm can employ supervised learning, semi-supervised learning, unsupervised learning, and/or reinforcement learning. Each of these listed type of machine-learning are well known in the art, and therefore will not be described herein.

In some scenarios, the machine-learning algorithm includes, but is not limited to, a decision tree learning algorithm, an association rule learning algorithm, an artificial neural network learning algorithm, a deep learning algorithm, an inductive logic programming based algorithm, a support vector machine based algorithm, a clustering based algorithm, a Bayesian network based algorithm, a representation learning algorithm, a similarity and metric learning algorithm, a sparse dictionary learning algorithm, a genetic algorithm, a rule-based machine learning algorithm, and/or a learning classifier systems based algorithm. Each of these listed type of machine-learning algorithms are well known in the art, and therefore will not be described herein. The machine-learning process implemented by the present solution can be built using Commercial-Off-The-Shelf ("COTS") tools (e.g., SAS available from SAS Institute Inc. of Cary, N.C.).

As shown in FIG. 1, system 100 comprises computing devices 102, 104, 106 communicatively coupled to a server 112 via a network 108. The computing devices can include, but are not limited to, personal computers, desktop computers, personal digital assistants, and/or smart phones. The network can include, but is not limited to, the Internet or Intranet. Wired and/or wireless communications can be used to communicate information between the computing devices, the network and the server.

Figure 2:
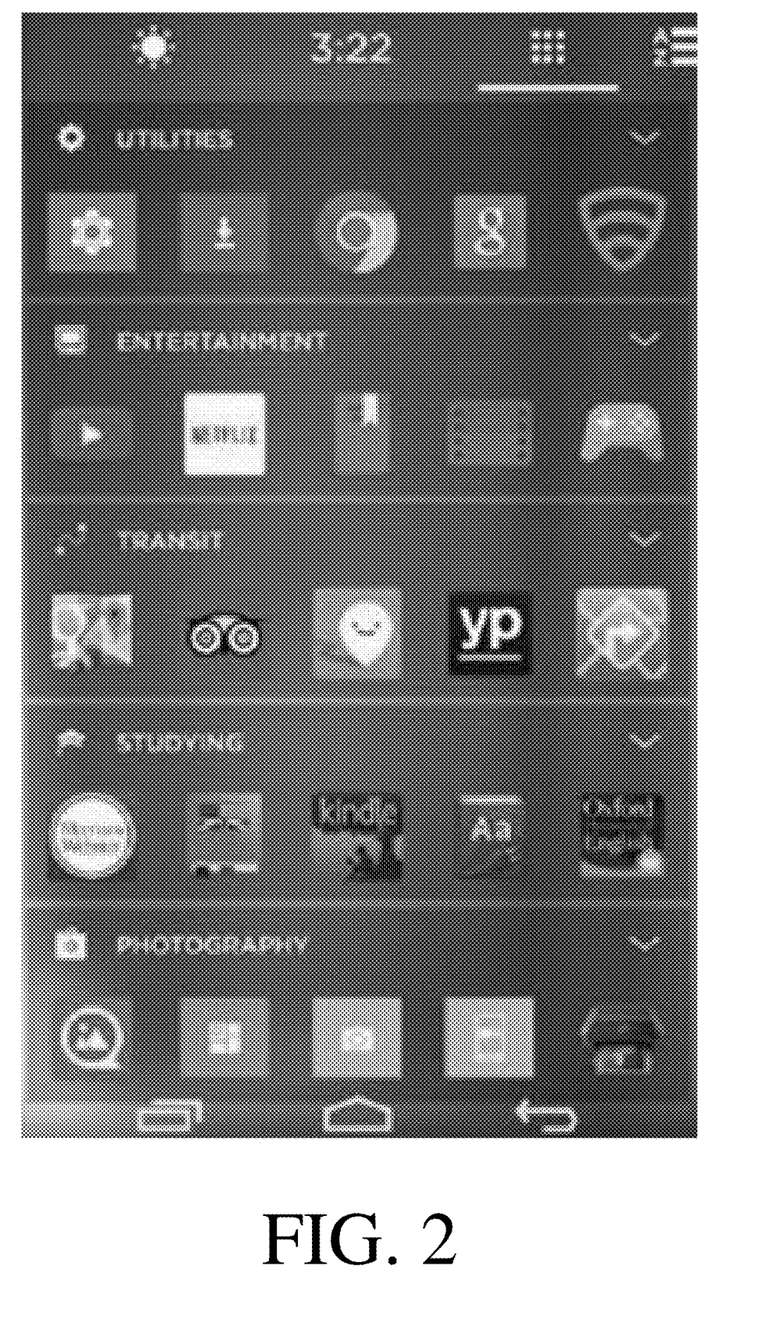
FIG. 2 is an illustration of an exemplary graphical user interface showing icons for a plurality of software applications.

During operation, each computing device 102-106 runs an application launcher. The application launcher comprises a computer program operative to assist a user to locate and start other software applications via shortcuts thereto. The term "shortcut", as used herein, refers to an icon that points to a software application or data file. A software application can be launched by double clicking on the respective shortcut or icon. In this regard, the shortcut or icon is a user-selectable shortcut or icon. The application launcher provides a Graphical User Interface ("GUI") for organizing the home screen and application icons in a computing environment. A schematic illustration of an exemplary GUI is provided in FIG. 2.

The application launcher implements a novel method for generating a list of software applications that are to be presented to the user via the GUI. Machine-learning is used to generate this list. In this regard, the application launcher collects information specifying the particulars of application launch requests for a plurality of users. In some scenarios, the collected information is then sent to the remote server 112 along with metadata for use as input data to one or more machine-learning algorithms. The metadata can indicate the version of the application launcher (e.g., receiver for Adroid®), date, time, device location (e.g., Global Positioning System ("GPS") data), current network access point, capabilities of the computing device being used by the user, user based organizational data (e.g., position held at the organization, duration of employment, etc.), and/or social media activity of the user.

All or a portion of the machine-learning algorithm(s) can be implemented in the computing device 102-106 and/or server 112. For simplicity of explanation, the present solution is described herein in accordance with the scenarios in which the machine-learning algorithm(s) is(are) entirely implemented in the server 112. Upon receipt by the server, the launch request information and metadata is stored in a datastore 114. Additionally, the server 112 uses the launch request information and metadata as inputs for the machine-learning algorithm(s).

In some scenarios, the machine-learning algorithm(s) calculate(s) a weighting value for each software application to which a user has access. The weighting value provides a measure of likelihood that the user wants to use the software application given his(her) current circumstances (e.g., location, time of day, position held in an organization, capabilities of the computing device being used by the user, etc.). The weighting value is determined based on user launch request data, metadata (e.g., user positon in an organization and/or user location) and/or software application similarities.

The weighting values are used by the sever 112 to prioritize software applications in an order from most important (or prominent) to least important (or prominent). This order is then used to generate a GUI with software application shortcuts or icons. The GUI may include (a) a highlighted pane with user-selectable icons for the top N (i.e., an integer) most important (or prominent) software applications or (b) a re-ordered list including user-selectable icons for all of the software application.

In some scenarios, the machine-learning algorithm(s) additionally or alternatively use(s) launch request information and metadata for a plurality of users to determine probability weighting values for software application launches during given time periods (e.g., 6 AM-8 AM) and/or at given device locations (e.g., New York or Chicago). The weighting value is determined based on the current circumstances of user(s), the launch patterns of the users with similar circumstances, the similarities of existing software applications, and/or the popularity of existing software applications at the present time and/or at a given location.

The probability weighting values are then used to: categorize the software applications in a plurality of different categories including a "popular with people like you" category, a "popular here" category, and/or a "popular now" category; and/or generate a re-ordered list in accordance with the probability weighting values. Software application icons can then be displayed in the GUI in accordance with the categorization thereof and/or re-ordered list. The similarity scores may also be used to identify an initial set of software applications to which the user should subscribe and/or to initialize the settings for the machine-learning algorithm.

Figure 3:
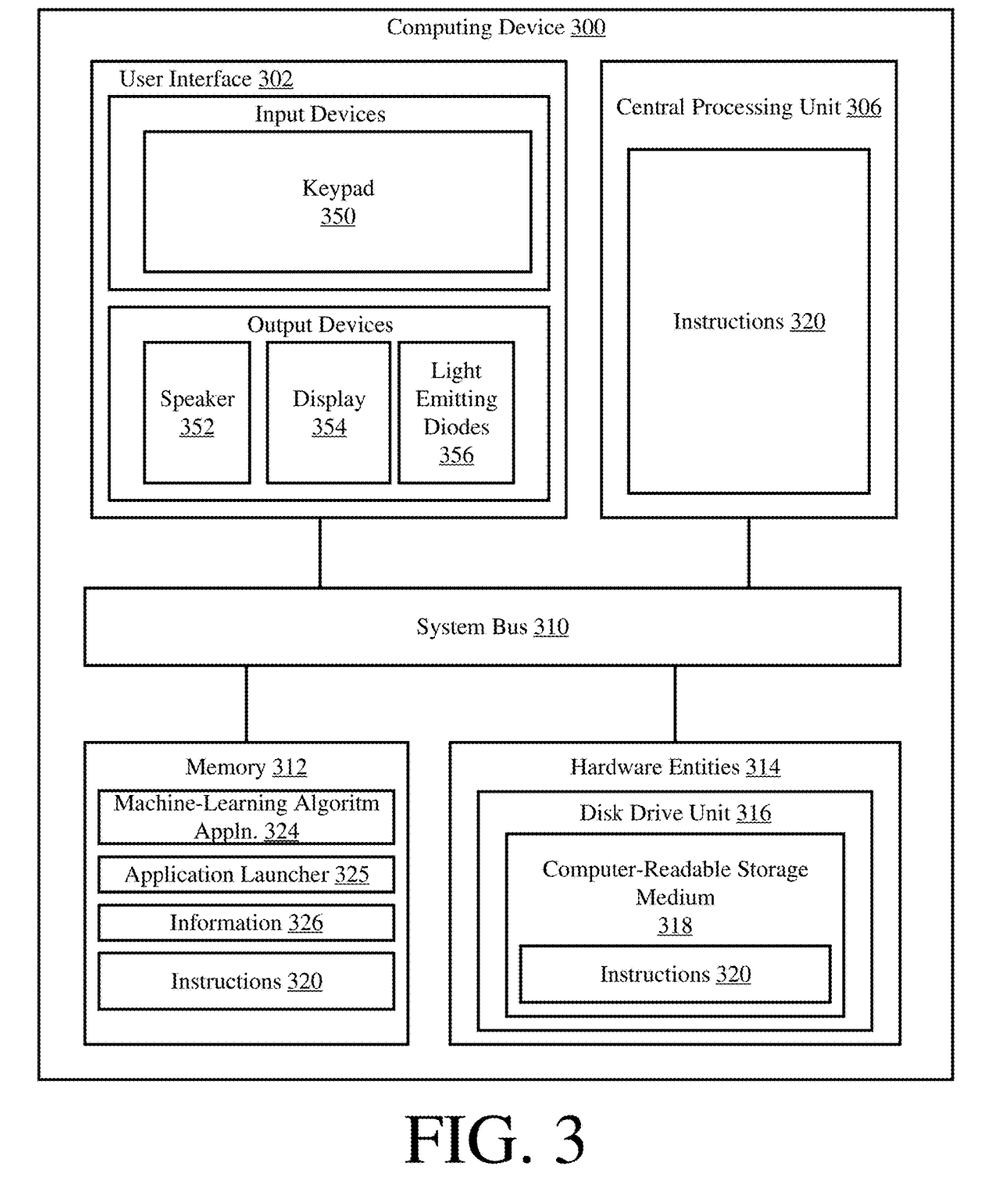
FIG. 3 is an illustration of an exemplary computing device.

Referring now to FIG. 3, there is provided a detailed block diagram of an exemplary architecture for a computing device 300. Computing device 102, 104, 106 and/or server 112 of FIG. 1 is(are) the same as or substantially similar to computing device 300. As such, the following discussion of computing device 300 is sufficient for understanding computing devices 102, 104, 106 and/or server 112 of FIG. 1.

Computing device 300 may include more or less components than those shown in FIG. 3. However, the components shown are sufficient to disclose an illustrative embodiment implementing the present solution. The hardware architecture of FIG. 3 represents one embodiment of a representative computing device configured to facilitate the generating and presenting of a list of software applications in accordance with results of a machine-learning algorithm. As such, the computing device 300 of FIG. 3 implements at least a portion of a method for application display and discovery by predicting behavior through machine-learning in accordance with the present solution.

Some or all the components of the computing device 300 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 3, the computing device 300 comprises a user interface 302, a Central Processing Unit ("CPU") 306, a system bus 310, a memory 312 connected to and accessible by other portions of computing device 300 through system bus 310, and hardware entities 314 connected to system bus 310. The user interface can include input devices (e.g., a keypad 350) and output devices (e.g., speaker 352, a display 354, and/or light emitting diodes 356), which facilitate user-software interactions for controlling operations of the computing device 300.

At least some of the hardware entities 314 perform actions involving access to and use of memory 312, which can be a RAM, a disk driver and/or a Compact Disc Read Only Memory ("CD-ROM"). Hardware entities 314 can include a disk drive unit 316 comprising a computer-readable storage medium 318 on which is stored one or more sets of instructions 320 (e.g., software code) configured to implement one or more of the methodologies, procedures, or functions described herein. The instructions 320 can also reside, completely or at least partially, within the memory 312 and/or within the CPU 306 during execution thereof by the computing device 300. The memory 312 and the CPU 306 also can constitute machine-readable media. The term "machine-readable media", as used here, refers to a single medium or multiple media (e.g., a centralized or distributed database, and/or associated caches and servers) that store the one or more sets of instructions 320. The term "machine-readable media", as used here, also refers to any medium that is capable of storing, encoding or carrying a set of instructions 322 for execution by the computing device 300 and that cause the computing device 300 to perform any one or more of the methodologies of the present disclosure.

In some scenarios, the hardware entities 314 include an electronic circuit (e.g., a processor) programmed for facilitating application display and discovery by predicting behavior through machine-learning in accordance with the present solution. In this regard, it should be understood that the electronic circuit can access and run at least one machine-learning algorithm application 224 installed on the computing device 200. The software application 224 is generally operative to cause communications of data to/from external devices, perform at least one machine-learning algorithm for purposes of predicting which software applications a user is likely or probably going to want to use at a given time and/or at a given location, generate lists of software applications based on results of the machine-learning algorithm(s), cause the display of the lists in a GUI, receive user-software interactions selecting content of the displayed lists, and/or cause software applications to be launched in response to the user-software interactions. Other functions of the software application 224 will become apparent as the discussion progresses.

Figure 4:
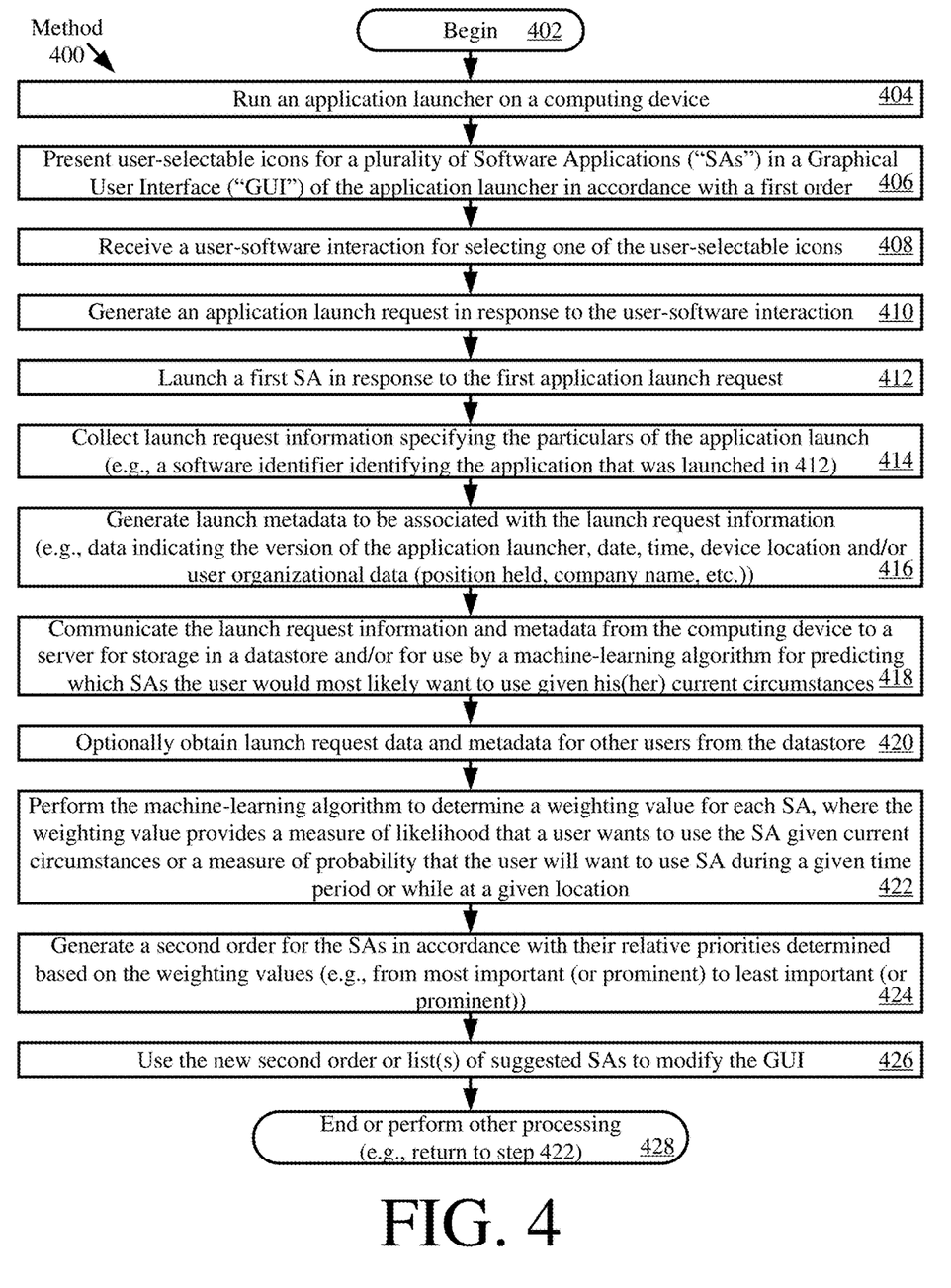
FIG. 4 is flow diagram of an exemplary method for application display and discovery by predicting behavior through machine-learning.

Referring now to FIG. 4, there is provided a flow diagram of an exemplary method 400 for discovery and display of software applications. Method 400 begins with 402 and continues with 404 where an application launcher (e.g., application launch 325 of FIG. 3) is run on a computing device (e.g., computing device 102, 104, 106 of FIG. 1 and/or computing device 300 of FIG. 3). User-selectable icons for a plurality of software applications are presented in a GUI of the application launcher in accordance with a first order, as shown by 406. The first order is determined based on pre-learnt estimates for which software applications the user would most likely want to use. The pre-learnt estimates are made based on behavior histories of other users with similar circumstances as those of the user (e.g., initial locations, position held at an organization, or other information about the other users' interests, employment, device capabilities, social media activity, etc.).

In some scenarios, 406 involves performing operations by the computing device or a remote server (e.g., server 112 of FIG. 1) to: categorize the user into a most likely group of a plurality of user groups based on the above criteria; and select a list of software applications generated for the user group with which the user was associated. Notably, the list for each user group is dynamically modified over time based on the behavior histories of newly assigned users.

It is possible that the user is assigned to two or more user groups. In this case, the computing device or server can automatically (i.e., without user input): (a) select one of the user groups for which the list should be presented to the user based on weighting values for the user groups (e.g., a group associated with CEO positions is considered more important than a group associated with Miami, Fla.); or (b) generate a combined list from the lists associated with the two or more user groups with which the user was associated. The combined list can include all or a portion of the software applications contained in each group list. The selection of which software applications should appear in the combined list can be based on the relative importance, popularity, similarity, and/or functionality of the software applications. The order in which the software applications appear in the combined list can be based on weighting values determined therefor. For example, software applications having higher relative weighting values associated therewith appear higher in the list than software applications having lower relative weighting values associated therewith. Software applications with the lowest relative weighting values are not included in the combined list since the list has an entry limit (e.g., 50 software application entries). The present solution is not limited to the particulars of this example.

Referring again to FIG. 4, method 400 continues with 408 where a user-software interaction for selecting one of the user-selectable icons is received at the computing device. In response to the user-software interaction, an application launch request is generated in 410. The first software application is launched in 412 responsive to the application launch request.

Information about the launch request is also collected by the computing device in 414. The launch request information includes, but is not limited to, information specifying the particulars of the application launch (e.g., a software identifier identifying the application that was launched in 412). Additionally in 416, metadata is generated by the computing device. The metadata can include, but is not limited to, data indicating the manufacturer of the application launcher, the name of the application launcher, the version of the application launcher, a date, a time, a device location, and/or user organizational data (e.g., position held, company name, social media activity, etc.).

In next 418, the launch request information and metadata is communicated from the computing device to the server for storage in a datastore (e.g., datastore 114 of FIG. 1) and/or for use by at least one machine-learning algorithm to predict which software applications the user would most likely want to use given his(her) current circumstances. The server may also optionally obtain launch request data and metadata for other users from the datastore.

Once this information is received/acquired by the server in 418 and/or 420, the server performs the machine-learning algorithm(s) by executing a software application (e.g., software application 324 of FIG. 3) implementing the same, as shown by 422. During operation, the software application calculates a weighting value for each software application. The weighting value provides (a) a measure of likelihood that a user wants to use the software application given his(her) current circumstances or (b) a measure of probability that the user will want to use the software application during a given time period or while at a given location. The weighting value is determined based on the current circumstances of user(s), the launch patterns of the users with similar circumstances, the similarities of existing software applications, and/or the popularity of existing software applications at the present time and/or at a given location In some scenarios, the weighting value for each software application is determined based on the importance of each type of data relative to each other. For example, a first software application has a high level of similarity to other software applications used frequently by the user and a low level of popularity amongst users. In contrast, a second software application has a low level of similarity to other software applications used frequently by the user and a high level of popularity amongst users. The level of software application similarity is considered more important than the level of software application popularity. Accordingly, the relative importance of the information is considered when determining the weighting value for the first and second software applications. In effect, the weighting value for the first software application is greater than the weighting value for the second software application (or stated differently, the first software application is more important (or prominent) than the second software application to this particular user). The present solution is not limited to the particulars of this example. Notably, the relative importance of the information considered here can change over time in accordance with changes in the user's circumstances.

The weighting values are then used in 424 to generate a second order for the software applications. For example, the software applications are placed in an order from highest weighting value to lowest weighting value (or stated differently, from most important to least important). The second order is used in 426 to dynamically modify the list presented via the GUI. For example, the displayed user-selectable icons are re-organized in accordance with the second order which is different than the first order. Subsequently, 428 is performed where method 400 ends or other processing is performed (e.g., method 400 returns to 422).

Notably, the order in which the user-selectable icons are to be presented or are presented in the GUI is dynamically modified on demand, on a periodic basis (e.g., every hour, day, week, month, etc.), and/or each time the application launcher is started. A person skilled in the art would readily appreciated how method 400 can be modified to implement the triggering operations for a user-selectable icon order change.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A method for ordering software applications in a computing environment, comprising:
    presenting user-selectable icons for launching a plurality of software applications in a graphical user interface of a first computing device in accordance with a first order;
    selecting, by the first computing device or a second remote computing device, at least one group from a plurality of groups in which a first user is a member based on first weighting values respectively assigned to the groups, wherein each said group has a list of software applications associated therewith which is different than lists of software applications associated with other ones of the plurality of groups;
    performing, by the first computing device or the second remote computing device, at least one machine-learning algorithm to determine a second weighting value for each software application of the plurality of software applications contained in the list associated with the at least one group which was selected from the plurality of groups, based on at least one of a first criteria specifying at least one aspect of a software launch request, a second criteria specifying a popularity of the software application, and a third criteria that is different than the second criteria and that specifies a learned behavior regarding software application usage of a plurality of people;
    performing, by the first computing device or the second remote computing device, at least a second machine-learning algorithm to determine a third weighting value based on a similarity of the first user to one or more second users among the plurality of people, the similarity based on a plurality of factors including the use of software applications, geographic location, organizational positions within a structure of an organization, and social media activities;
    assigning, by the first computing device or the second remote computing device, the plurality of software applications to a plurality of different categories based on the first, second and third weighting values; and
    dynamically modifying the graphical user interface to present the user-selectable icons in accordance with category assignments made during said assigning.

2. The method according to claim 1, wherein the second weighting value provides a measure of likelihood that the first user wants to use a software application given a current circumstance of the first user or a measure of probability that the first user will want to use the software application during a given time period or while at a given location.

3. The method according to claim 1, wherein the second weighting value is further determined based on at least one of current circumstances of second users, software launch patterns of the second users, and similarities of existing software applications.

4. The method according to claim 1, wherein the second weighting value is determined based further on a position held by the first user at the organization.

5. The method according to claim 1, further comprising determining the first order based on pre-learnt estimates for which software applications a user of the computing device would most likely want to use.

6. The method according to claim 5, wherein the pre-learnt estimates are made based on behavior histories of second users with current circumstances that match a current circumstance of the first user by a certain degree.

7. The method according to claim 1, further comprising determining the first order by:
    identifying at least one first user group of a plurality of user groups to which the first user should be assigned based on behavior histories of second users with current circumstances that match a current circumstance of the first user by a certain degree; and
    selecting the first list of software applications generated for the first user group.

8. The method according to claim 7, wherein the first list of software applications is dynamically modified over time based on behavior histories of newly assigned users of the first user group.

9. The method according to claim 1, further comprising generating a combined list of software applications by combining at least a portion of a list of software applications associated with a first group selected from the plurality of groups and at least a portion of a list of software applications associated with a second group selected from the plurality of groups, wherein the at least one machine learning algorithm determines the second weighting value for each software application in the combined list.

10. The method according to claim 1, wherein an order in which the user-selectable icons are presented in the graphical user interface is dynamically modified on demand, on a periodic basis, or each time an application launcher is started.

11. The method according to claim 1, wherein information about the organization is used to define an initial seed state of the machine-learning algorithm.

12. The method according to claim 1, wherein information indicating an initial location of the first user is used to define an initial seed state of the machine-learning algorithm.

13. The method according to claim 1, wherein the machine-learning algorithm learns behaviors based on activities performed by multiple users.

14. A system for ordering software applications in a computing environment, comprising:
    a processor; and
    a non-transitory computer-readable storage medium comprising programming instructions that are configured to cause the processor to implement a method for inventory management, wherein the programming instructions comprise instructions to:
        cause user-selectable icons for launching a plurality of software applications to be presented in a graphical user interface in accordance with a first order;
        select at least one group from a plurality of groups in which a first user is a member based on first weighting values respectively assigned to the groups, wherein each said group has a list of software applications associated therewith which is different than lists of software applications associated with other ones of the plurality of groups;

perform a machine-learning algorithm to determine a second weighting value for each software application of the plurality of software applications contained in the list associated with the at least one group which was selected from the plurality of groups, based on at least one of a first criteria specifying at least one aspect of a software launch request, a second criteria specifying a popularity of the software application, and a third criteria that is different than the second criteria and that specifies learned behavior regarding software application usage of a plurality of people;

performing, by the first computing device or the second remote computing device, at least a second machine-learning algorithm to determine a third weighting value based on a similarity of the first user to one or more second users among the plurality of people, the similarity based on a plurality of factors including the use of software applications, geographic location, organizational positions within a structure of an organization, and social media activities;

assign the plurality of software applications to a plurality of different categories based on at least one of the first, second and third weighting values; and dynamically modifying the graphical user interface in accordance with category assignments made during said assigning.

15. The system according to claim 14, wherein the second weighting value provides a measure of likelihood that the first user wants to use a software application given a current circumstance of the first user or a measure of probability that the first user will want to use the software application during a given time period or while at a given location.

16. The system according to claim 14, wherein the second weighting value is further determined based on at least one of current circumstances of second users, software launch patterns of the second users with current circumstances that match a current circumstance of the first user by a certain degree, similarities of existing software applications, and popularity of existing software applications at a present time and/or at a given location.

17. The system according to claim 14, wherein the second weighting value is determined based further on a position held by the first user at the organization.

18. The system according to claim 14, wherein the programming instructions further comprise instructions to determine the first order based on pre-learnt estimates for which software applications a user of the computing device would most likely want to use.

19. The system according to claim 18, wherein the pre-learnt estimates are made based on behavior histories of second users with current circumstances that match a current circumstance of the first user by a certain degree.

20. The system according to claim 14, wherein the first order is determined by:

identifying at least one first user group of a plurality of user groups to which the first user should be assigned based on behavior histories of second users with current circumstances that match a current circumstance of the first user by a certain degree; and selecting the first list of software applications generated for the first user group.

21. The system according to claim 20, wherein the first list of software applications is dynamically modified over time based on behavior histories of newly assigned users of the first user group.

22. The system according to claim 14, wherein the programming instructions further comprise instructions to generate a combined list of software applications 1 by combining at least a portion of a list of software applications associated with a first group selected from the plurality of groups and at least a portion of a list of software applications associated with a second group selected from the plurality of groups, wherein the at least one machine learning algorithm determines the second weighting value for each software application in the combined list.

23. The system according to claim 14, wherein an order in which the user-selectable icons are presented in the graphical user interface is dynamically modified on demand, on a periodic basis, or each time an application launcher is started.

* * * * *